April 7, 1964  W. J. STREETMAN  3,127,640
SEALING STRIP
Filed March 29, 1962

INVENTOR.
William J. Streetman
BY
Herbert Furman
ATTORNEY

United States Patent Office 3,127,640
Patented Apr. 7, 1964

3,127,640
SEALING STRIP
William J. Streetman, Madison Heights, Mich., assignor to General Motors Corporation, Detroit, Mich., a corporation of Delaware
Filed Mar. 29, 1962, Ser. No. 183,443
3 Claims. (Cl. 20—69)

This invention relates to sealing strips and more particularly to flexible elongate sealing strips for sealing closures.

The sealing strip of this invention is an improvement of that shown in the copending application of Alley et al., S.N. 17,639, filed March 25, 1960, and now abandoned, and assigned to the assignee of this invention. The sealing strip shown in the aforementioned application includes a resilient elongate body of polyvinyl resin foam material and an outer coextensive layer of substantially nonporous or solid polyvinyl resin which is formed integrally with the body so as to encase the body of the strip. The base section of the strip includes a number of headed buttons of solid polyvinyl resin which project from the base layer and provide the mounting means for mounting the strip on a support member.

The main feature of this invention is that it provides an improved integral mounting means for mounting a sealing strip on a support member. In carrying out this feature of the invention, the base section of the strip is provided with a continuous longitudinal upwardly opening groove and the access passages which extend from within the buttons open to this groove. The access passages within the buttons receive a suitable tool so that the heads of the buttons can be stretched for insertion through openings of smaller diameter in the support member. By having the access passages open to the groove, the tool is guided between each successive opening and automatically enters each successive opening without requiring the operator to probe for the opening. Thus, the operator can very easily and quickly mount the sealing strip on a support member.

This and other features of the invention will be readily apparent from the following specification and drawings wherein.

Figure 1:
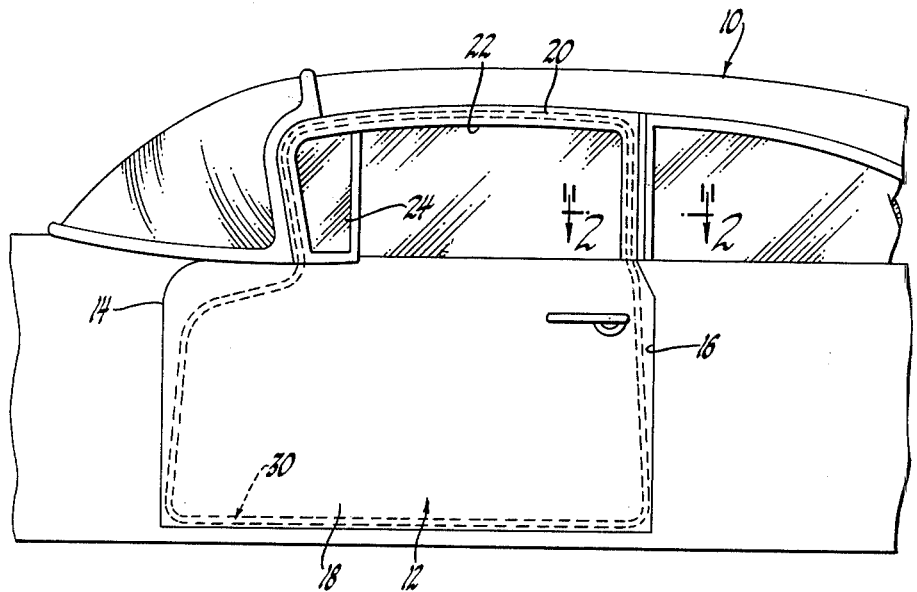
FIGURE 1 is a partial side elevational view of a vehicle body having a door mounted thereon for movement between open and closed positions, with the door mounting a sealing strip according to this invention to seal the door to the body in the closed position thereof.

Referring now particularly to FIGURE 1 of the drawings, a vehicle body 10 includes a front door 12 hinged adjacent its forward edge 14 to the body for movement between a closed position as shown, and an open position, not shown. Door 12 is latched in its closed position to the body by suitable latching means mounted on the lock pillar face of the door adjacent the rear edge 16 thereof. Door 12 includes a lower door section 18 and an upper door window frame section 20 which defines the door window opening for the vertically movable door window 22 and the swingable ventilation window 24.

Figure 2:
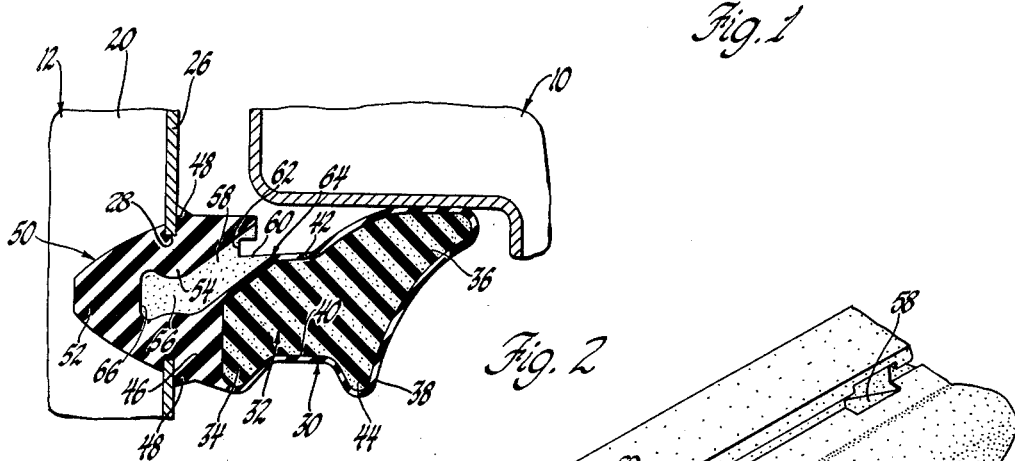
FIGURE 2 is an enlarged sectional view taken generally along the plane indicated by line 2—2 of FIGURE 1; and, FIGURE 3 is a perspective view of a portion of the sealing strip.

Referring now particularly to FIGURE 2 of the drawings, the intermediate wall 26 or jamb face of the door window frame section 20 includes a number of spaced apertures 28. It will be understood that the apertures 28 are provided around the door window frame section 20 and that similar apertures are also provided in the front hinge pillar face, the rear lock pillar face, and the lower face of the lower door section 18. As shown in FIGURE 2, the apertures 28 mount a sealing strip 30 according to this invention to seal the door 12 to the body in the closed position thereof.

Figure 3:
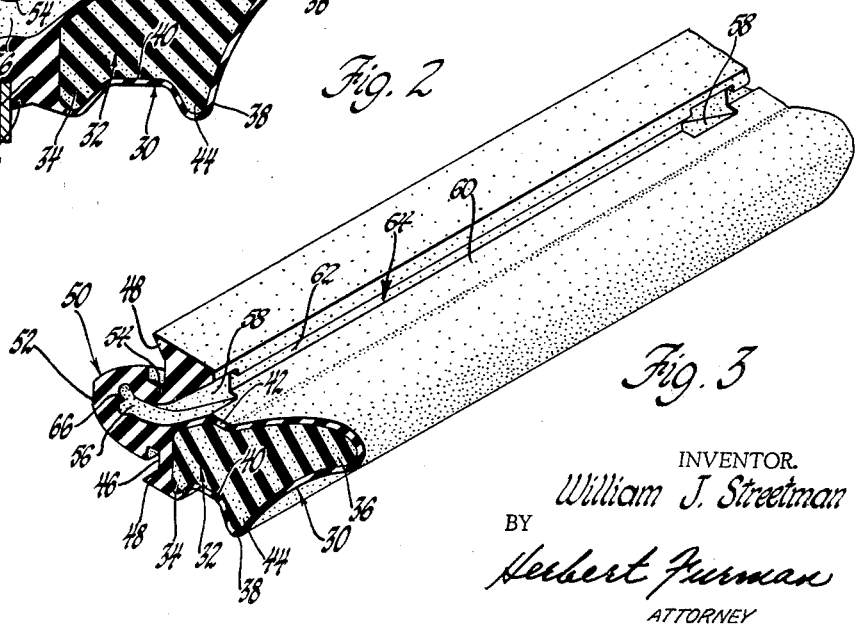

The sealing strip 30 will now be described with particular reference to FIGURES 2 and 3 of the drawings. Strip 30 generally includes a resilient elongate body 32 of polyvinyl resin foam material which includes a base section 34 and an integral angularly outwardly extending sealing lip 36 which projects from the upper side or surface of the base section. Body 32 is encased within an outer coextensive layer 38 of solid polyvinyl resin material which is formed integrally with the body 32 so as to provide a coextensive phase between the layer 38 and the body 32. The outer layer 38 is generally thin around the sealing lip 36, and the side walls 40 and 42 of the base section 34 as well as around a rigidifying rib 44 which projects generally laterally from the base section and generally opposite to the sealing lip 36. Layer 38 includes a substantially thick base layer 46 on the lower wall of the base section 34, with layer 46 generally including a pair of laterally extending continuous elongate sealing ribs 48 adjacent each side thereof which are deformed and which seal the strip 30 to the support member when it is mounted thereon as shown in FIGURE 2.

A plurality of spaced integral mounting buttons 50 project laterally from the layer 46 and are located generally intermediate the sealing ribs 48. Buttons 50 provide the mounting means for mounting the sealing strip 30 on the body as will be further described. Generally, these buttons include an ogival or bullet-shaped head 52 joined to the base layer 46 by a neck 54 of smaller diameter than the largest diameter of the head 52. As shown in FIGURE 2, the neck 54 and head 52 of each of the buttons include therewithin a generally rectangularly shaped passage 56 which joins to a generally angularly extending rectangularly shaped passage 58 which opens outwardly of strip 30 to the base wall 60 and side wall 62 of a longitudinally extending groove 64 which extends continuously along the sealing strip 30. Passage 56 terminates in a bulbous end 66 to provide for ease of stretching of the buttons.

When it is desired to mount the sealing strip 30 on the door or support member, a suitable tool of known type is inserted through the passages 56 and 58, with this tool being provided with a bulbous shaped end complementary to the bulbous shaped end 66 of passage 56. The head 52 and neck 54 of the button are then stretched with respect to the base layer 46 so that the head of the button can be inserted through the aperture 28 in the support member. The largest diameter of the head 52 is greater than the diameter of the aperture 28, whose diameter is approximately equal to that of the neck 54. Thereafter, the tool is removed from the passages 56 and 58 but need not be moved out of contact with the sealing strip 30, since all that the operator need do is to withdraw the bulbous shaped end of the tool out of the passages 56 and 58 until this end of the tool is within the groove 64, and then move the tool longitudinally of the sealing strip until the bulbous shaped end of the tool automatically enters into the next successive opening so as to stretch the next successive button. Thus, the operator need not probe for each successive opening but can insert the tool, stretch the button, insert the button through the aperture in the support member, withdraw the tool, move the tool longitudinally of the sealing strip, stretch the next successive button, etc. in a continuous and fast operation. Thus, a sealing strip embodying mounting means according to this invention can be mounted on a vehicle body with a greater degree of efficacy than previously known sealing strips.

Although the mounting means of this invention has been shown and described in conjunction with a sealing strip which includes a body of polyvinyl resin foam material and an outer coextensive layer of substantially nonporous or polyvinyl resin formed integral therewith, it will be understood, of course, that the mounting means are not limited to a sealing strip made of any particular material and may be used with sealing strips made of other materials.

Thus, this invention provides a sealing strip having new and improved mounting means formed integrally therewith so as to provide for ease of mounting of the strip on a support member.

What is claimed is:

1. A flexible sealing strip comprising, a resilient elongate body including a base section and an integral sealing lip projecting from one side of said base section, a plurality of spaced headed mounting buttons projecting from an opposite side of said base section, a plurality of passageways, each being respective to one of said buttons, said passageways terminating at one end thereof within said buttons and opening at the other end thereof to said one side of said base section and underneath said sealing lip to provide for the insertion of a mounting tool within said headed buttons to stretch said buttons prior to projection thereof through spaced respective apertures in a support member, and means guiding said tool along said base section between the openings of said passageways to prevent movement of said tool laterally of said base section as said tool moves between said passageway openings and to cause said tool to automatically enter each successive opening.

2. A flexible sealing strip comprising, a resilient elongate body including a base section and an integral sealing lip projecting from one side of said base section, a longitudinal guide passage in said base section opening to said one side thereof, a plurality of spaced headed mounting buttons projecting from an opposite side of said base section, a plurality of passageways, each being respective to one of said buttons, said passageways terminating at one end thereof within said buttons and opening at the other end thereof to said guide passage to provide for the insertion of a mounting tool within said headed buttons to stretch said buttons prior to projection thereof through spaced respective apertures in a support member, said guide passage being of less depth than said passageways and guiding said tool along said base section between the openings of said passageways to prevent movement of said tool laterally of said base section as said tool moves between said passageway openings and to cause said tool to automatically enter each successive opening.

3. A flexible sealing strip comprising, a resilient elongate body including a base section and an integral sealing lip projecting from one side of said base section, an elongate groove in said base section opening to said one side thereof and including a base wall inset from said one side and a pair of side walls connecting said base wall to said one side, a plurality of spaced headed mounting buttons projecting from another side of said base section, a plurality of passageways, each being respective to one of said buttons, said passageways terminating at one end thereof within said buttons and opening at the other end thereof to said base wall to provide for the insertion of a mounting tool within said headed buttons to stretch said buttons prior to projection thereof through respective spaced apertures in a support member, said groove being of less depth than said passageways and guiding said tool along said base section as said tool moves between the openings of said passageways to prevent movement of said tool laterally of said base section and to cause said tool to automatically enter each successive opening.

References Cited in the file of this patent
UNITED STATES PATENTS

| | | |
|---|---|---|
| 1,694,291 | Sywert | Dec. 4, 1928 |
| 2,585,438 | Clingman | Feb. 12, 1952 |
| 2,638,642 | Spraragen | May 19, 1953 |